Jan. 31, 1933.      A. L. GARFORD      1,895,791
CONDUIT FITTING
Filed Dec. 13, 1930
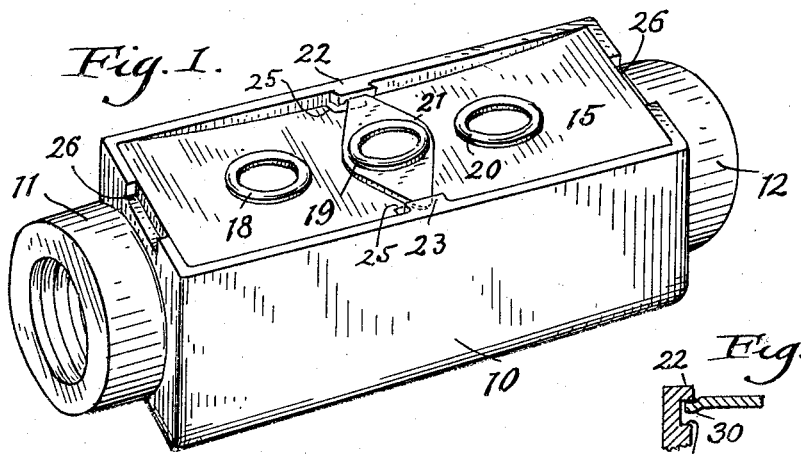
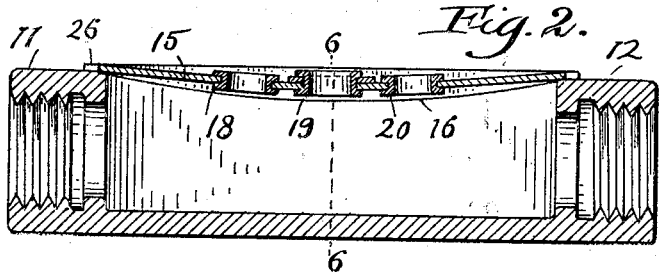
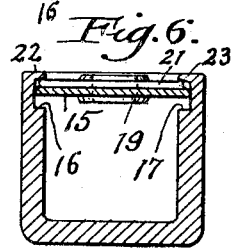
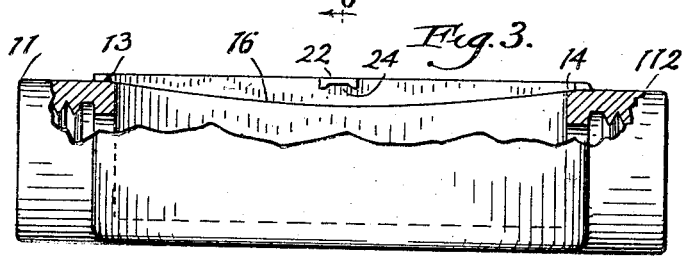
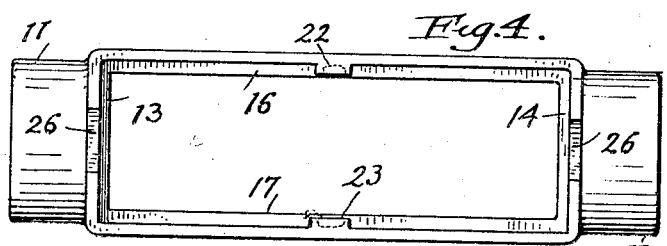
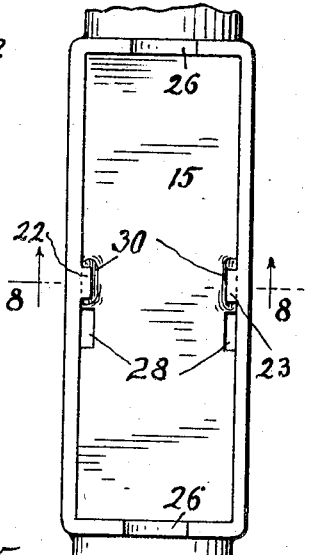
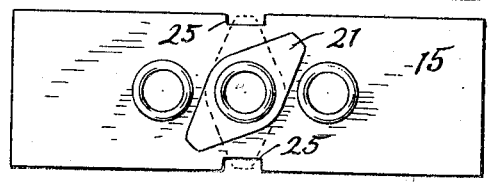

Patented Jan. 31, 1933

1,895,791

UNITED STATES PATENT OFFICE

ARTHUR L. GARFORD, OF ELYRIA, OHIO

CONDUIT FITTING

Application filed December 13, 1930. Serial No. 502,109.

This invention relates to fittings for electrical conduits and more especially to such fittings as junction boxes and outlet boxes.

It is one of the objects of the invention to provide a fitting, of the type referred to, with a readily removable cover that is retained in position by means which renders the use of screws and similar attaching devices unnecessary.

It is a further object of the invention to provide a fitting of the type referred to, that will be simple in construction and comparatively inexpensive to manufacture, and that is provided with a cover that may be quickly and conveniently placed in position without requiring the use of any tools.

Other objects of the invention and features of novelty will be apparent from the following description, taken in connection with the accompanying drawing, of which Figure 1 is a perspective view of a fitting embodying my invention.

Fig. 2 is a longitudinal section thereof.

Fig. 3 is a side elevation of the same with certain parts broken away and shown in section.

Fig. 4 is a plan view of the open side of the fitting.

Fig. 5 is a plan view of the cover that is shown in Figs. 1 and 2.

Fig. 6 is a transverse section on the line 6—6 of Fig. 2.

Fig. 7 is a plan view showing the fitting with another form of cover thereon.

Fig. 8 is a detail section on the line 8—8 of Fig. 7, and

Fig. 9 is a plan view of a plain cover that may be used, under certain conditions, instead of the covers illustrated in Figs. 1 and 7.

Referring to the drawing, 10 indicates a fitting, in the form of a rectangular box having the interiorly threaded bosses 11 and 12 on its opposite ends to which the electrical conduit may be attached. As shown in the drawing, the upper side of the box 10 is open, and there are interior ledges 13 and 14 on the end walls, these ledges being spaced slightly below the top of the box to provide seats for the ends of the cover 15. The side walls of the box are provided with interior ledges 16 and 17, which are concavely curved with reference to the open side of the box, as clearly shown in Figs. 2 and 3. The box 10 is preferably made of an aluminum alloy, so as as to be light in weight and yet strong enough for the service for which the box is employed.

The cover 15 is preferably made from a resilient material, such as rolled aluminum, steel or other springy metal, or may be made from bakelite or other insulating material of a resilient nature.

The cover 15, as shown in Figs. 1 and 2, is provided with openings in which there are eyelets 18, 19 and 20, these eyelets being made of a suitable insulating material in case the cover 15 is made of metal. A swinging latch 21 is pivotally secured to the cover 15 by means of the eyelet 19, and the ends of this latch are adapted to engage under inwardly projecting lugs 22 and 23 which are arranged on opposite sides of the box 10 and overlie the ledges 16 and 17. Each of the lugs 22 and 23 has its under side recessed, as indicated at 24, to receive the ends of the latch 21 and thereby releasably retain the latch 21 in the position shown in Fig. 1.

Referring to Fig. 5, it will be noted that the cover 15 has notches 25 in its opposite edges, these notches providing spaces through which the lugs 22 and 23 pass when the cover is placed in position on the box 10. In positioning the cover on the box the latch 21 is first swung to the position shown in Fig. 5, which permits the cover to be placed in position with its ends resting on the ledges 13 and 14. The central portion of the cover 15 is then depressed sufficiently to allow the latch 21 to be swung to the position shown in Fig. 1, where it engages under the lugs 22 and 23.

The eyelets 18, 19 and 20 afford openings through which wires may extend through the cover into the box 10. When it is unnecessary to have wires extend through the cover 15, either of the covers shown in Figs. 7 or 9 may be used. The cover shown in Fig. 9 is simply a strip of resilient metal or insulating material and is placed in position on the box by entering one end of the cover under the lugs 22 and 23 and then sliding the cover endwise of the box along the curved ledges 16 and 17 until the ends of the cover become seated on the ledges 13 and 14. When in this position the cover will have its central portion sprung downwardly toward the bottom wall of the box, by the lugs 22 and 23, so that the cover will be securely held in position. From Figure 1 it will be noted that the end walls of the box are notched, as indicated at 26, and these notches permit the insertion of a screw-driver or other tool under the ends of the box so as to permit the ends to be sprung upwardly when it is desired to remove the cover.

Referring to Figs. 7 and 8 it will be noted that the cover shown is similar to that shown in Fig. 9, with the exception that it is provided with the notches 28 in its opposite edges and with slight indentations 30, in these same edges, adjacent the notches. This cover is placed in position on the box by passing the notched portions 28 over the lugs 22 and 23 and then moving the cover endwise to enter the lugs in the indentations 30, the resiliency of the material of the cover holding the lugs in engagement with the indentations. This form of cover is removed in the same manner as described in connection with the plain cover illustrated in Fig. 9.

While I have illustrated and described what I now consider to be the preferred forms of my invention, it will be understood that changes in the details of construction may be made without departing from the spirit of the invention which is defined in the appended claims.

Having thus described my invention, what I claim is:

1. An electrical conduit fitting consisting of a box having an open side and interior ledges on opposite walls and inwardly projecting lugs on some of said walls overlying and spaced from the ledges thereon, and a cover of resilient material for said open side having edge portions positioned between said ledges and said lugs engaging some of said ledges and having retaining means on its outer surface engaging said lugs.

2. An electrical conduit fitting consisting of a box having an open side and interior ledges on opposite walls and lugs on some of said walls overlying and spaced from the ledges thereon, and a cover of resilient material for said open side engaging some of said ledges, said cover having a latch member pivoted thereon and adapted to cooperate with said lugs to retain said cover in position.

3. An electrical conduit fitting consisting of a box having an open side and interior ledges on its walls, the ledges on two opposite walls being concavely curved with respect to said open side, the last-mentioned walls having inwardly projecting lugs overlying said concavely curved ledges, and a cover of resilient material for said open side releasably held in position between said lugs and said ledges.

4. An electrical conduit fitting consisting of a box having an open side and interior ledges on its walls, the ledges on two opposite walls being concavely curved with respect to said open side, the last-mentioned walls having inwardly projecting lugs overlying said concavely curved ledges, and a cover of resilient material having depressions in its edges to cooperate with said lugs and releasably retain the cover in position on said ledges.

5. An electrical conduit fitting consisting of a box having an open side and interior ledges on its walls, two of the walls of said box having inwardly projecting lugs adjacent said open side, and a cover of resilient material supported on said ledges and retained thereon by said lugs, said cover having indentations in its edges to receive said lugs and notches adjacent said indentations.

6. As a new article of manufacture a metal conduit fitting having an open side and interior ledges on its walls, the ledges on two opposite sides being concavely curved with respect to said open side, and there being inwardly projecting lugs on said opposite sides overlying said concavely curved ledges but spaced therefrom.

In testimony whereof, I hereunto affix my signature.

ARTHUR L. GARFORD.